Patented May 30, 1933

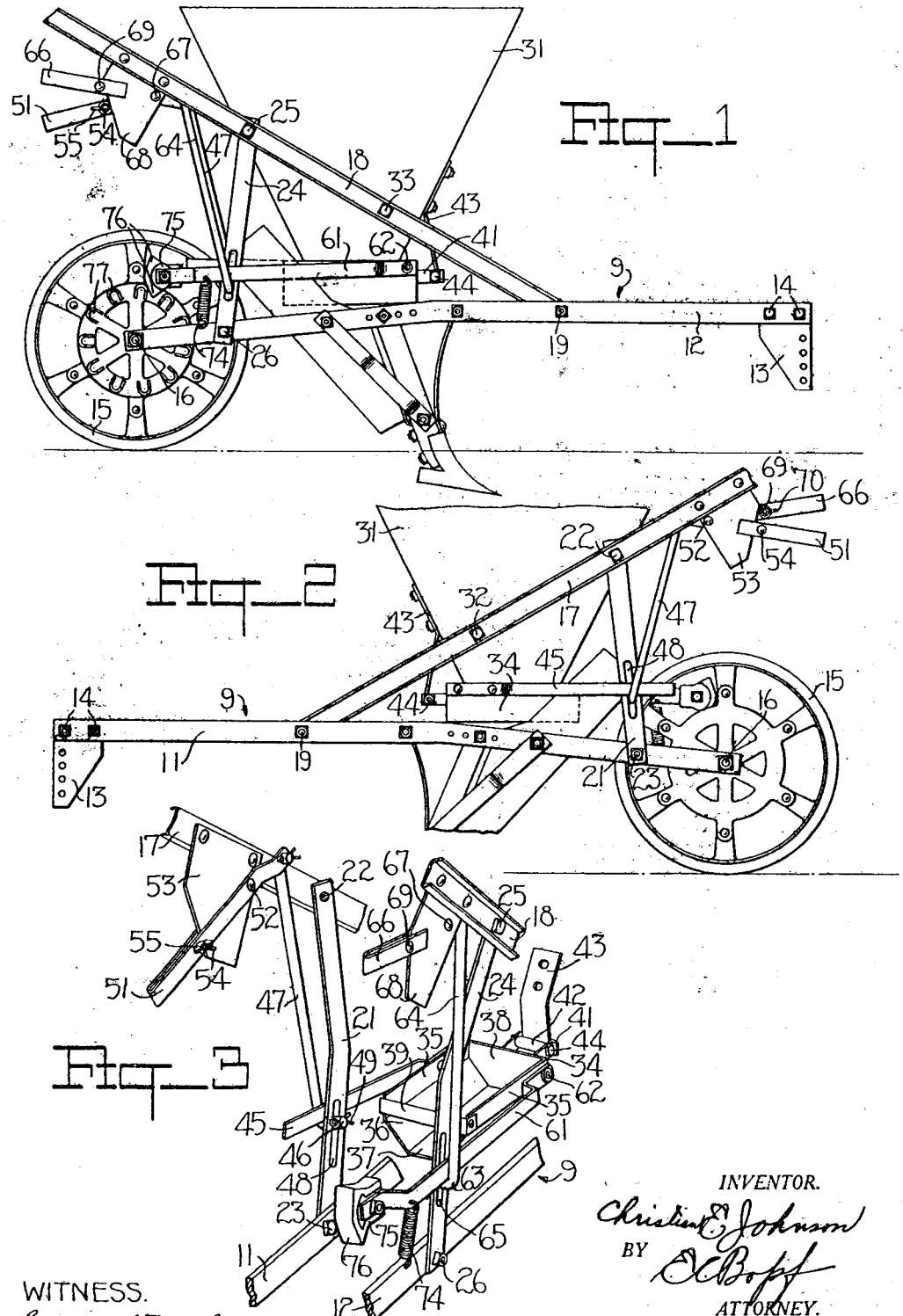

1,912,145

UNITED STATES PATENT OFFICE

CHRISTIAN E. JOHNSON, OF MOLINE, ILLINOIS, ASSIGNOR TO DEERE & COMPANY, OF MOLINE, ILLINOIS, A CORPORATION OF ILLINOIS

FERTILIZER DISTRIBUTOR

Application filed November 18, 1931. Serial No. 575,695.

My invention relates to fertilizer distributors and particularly to that type employing a vibrating delivery pan which is actuated by a reciprocating pitman adapted to receive motion by contact with the supporting wheel of the implement.

The object of my invention is the provision of a distributor having a separate adjusting means within convenient reach of the operator for adjusting the inclination of the vibrating delivery pan with respect to the horizontal, and for changing the relation of the pitman and the wheel to change the length of stroke of the pitman to vary the rate of discharge and obtain the proper discharge action, the arrangement being such that the actuation of either adjusting means does not affect the adjustment of the other.

With such a distributor, after the proper length of pitman stroke for a given inclination setting of the pan has been determined to obtain the proper discharge action for the fertilizer being used, it is merely necessary to maintain the pan this determined inclination with respect to the horizontal through the separate adjustment therefor, to compensate for change in the slope of the land, to maintain an even discharge when operating on rolling land, or when reversing the direction of travel.

Other objects and advantages of my invention will be apparent to those skilled in the art after a consideration of the following detailed description taken in conjunction with the accompanying drawing wherein:

Figure 1 is an elevational view of the right hand side of the fertilizer distributor showing the reciprocating pitman and adjusting means therefor;

Figure 2 is a fragmentary elevational view of the left hand side of the fertilizer distributor showing the adjusting mechanism for leveling the delivery pan; and, Figure 3 is an enlarged fragmentary perspective view of a portion of the frame with the hopper removed and showing the improved adjusting mechanism.

The implement frame is referred to in its entirety by numeral 9 and comprises bars 11 and 12 which are spaced apart at their rear ends and converge forwardly to engage a clevis 13 which is securely clamped between the front ends of the bars by bolts 14. The supporting wheel 15 is journaled on a bolt 16 which extends between the bars 11 and 12 adjacent the rear ends thereof. Handles 17 and 18 are secured to the frame bars 11 and 12 respectively, by means of bolts 19, and incline upwardly and rearwardly therefrom. Hand grips (not shown) are secured on the upper end of each handle 17 and 18. A brace member 21 is secured to the handle 17 by means of a bolt 22 and extends downwardly and rearwardly therefrom and is secured to the frame bar 11 by the bolt 23. A similar brace 24 is secured to the handle 18 by a bolt 25 and extends downwardly and rearwardly and is connected to frame bar 12 by bolt 26.

A fertilizer container or hopper 31 is positioned between the handles 17 and 18 and comprises sloping walls which converge downwardly to a central discharge opening. The hopper 31 is secured to the handles 17 and 18 by means of the bolts 22 and 25 and similar bolts 32 and 33 all of which extend through the respective side walls of the hopper.

A vibrating delivery pan 34 is positioned beneath the lower end of the hopper 31 below the central discharge opening thereof. Pan 34 comprises a trough-like member having parallel sides which are disposed in a vertical plane adjacent the upper edge as indicated by numeral 35 and converging downwardly therefrom at 36 to a horizontally disposed bottom plate 37. The front end of the pan is closed by means of the end sheet 38 and the rear or discharge end is open to permit the fertilizer to spill therefrom as the pan is vibrated. A brace strip 39 extends between the side portions 35 of the parallel sides adjacent the rear ends thereof and serves to prevent the sides from spreading at the rear end.

A supporting bracket 41 is secured to the front end 38 of the pan and includes a pair of forwardly extending spaced parallel fingers. A hinge knuckle 42 is formed on the lower end of a resilient strap 43, which is secured to the front side of the hopper 31, and is disposed between the fingers. A pivot bolt 44 extends through aligned holes in the fingers and through the hinge knuckle.

A bar 45 is secured to one side of the pan 34 and extends rearwardly beyond the open end thereof and is supported on the laterally bent end 46 of an adjusting link 47. The bent end 46 extends through a slot 48 in the brace member 21 and is retained therein by means of a cotter pin 49. The adjusting link extends upwardly to a pivotal connection with an adjusting lever 51 which is pivotally mounted at 52 on a clamping plate 53 secured to the handle 17. The adjusting lever 51 extends beyond the edge of the plate 53 and is bent upon itself so as to embrace both ends of the plate 53 in a clamping manner. A bolt 54 having a wing nut 55 serves to clamp the lever against the sides of the clamping plate 53 and thereby secure the lever 51 in any position of adjustment. As noted in Figure 3 of the drawing, the bar 45 is retained between the link 47 and brace 21 and extends rearwardly therefrom a sufficient distance to permit the maximum movement of the pan without slipping off the end 46 of the adjusting rod. The delivery pan 45 is adjustable vertically about its pivot 44 within the limits of the slot 48 and by adjusting the lever 51 the pan 34 may be maintained in any desired angular position with respect to the horizontal.

A reciprocating pitman arm 61 is pivotally connected at 62 to the opposite side of the pan 34 adjacent the closed front end thereof and is supported on the bent end 63 of an adjusting link 64 in a manner similar to bar 45. The bent end 63 engages a slot 65 in the brace 24 and is adjustable within the limits of the slot by the adjusting lever 66. The upper end of adjusting link 64 is connected to lever 66 in a manner similar to the connection between link 47 and lever 51. The lever 66 is pivoted at 67 on the clamping plate 68 which is secured to the handle 18 and is secured in any desired adjustment by means of a bolt 69 and wing nut 70. The pitman 61 is held in contact with the bent end 63 of the adjusting rod 64 by means of a spring 74 which extends between the pitman and the frame bar 12. The rear end of the pitman is offset inwardly and an impact block 75 is secured thereon. The surface at the rear end of the impact block 75 is beveled at 76 each side of the longitudinal center line. A plurality of equidistantly spaced driving lugs 77 are provided on one side of the supporting wheel 15 and these lugs are adapted to engage the lower beveled surface of the impact block 75. After one beveled surface has become worn the impact block may be turned over, thereby presenting a new contacting surface for the driving lugs 77. As the wheel 15 rotates, the pitman 61 is moved forwardly against the tension of the resilient strap 43 by the contact of the driving lug with the impact block. When the contacting driving lug revolves beyond a point of contact with the impact block the pitman is forced rearwardly by the tension of the resilent strap 43 until the impact block contacts with the next adjacent driving lug. The impact block and the driving lug collide with considerable force and this sudden stopping causes a portion of the fertilizer, which is carried in the delivery pan 34, to be spilled off the rear end thereof. It is customary in this type of fertilizer distributor to vary the quantity of fertilizer to be deposited upon the ground by vertically adjusting the rear end of the pitman 61. By adjusting the rear end of the pitman the driving lugs may contact with any desired point on the beveled surface, thereby varying the length of stroke of the pitman which also varies the force of contact between the driving lug and the impact block and causing a relative corresponding amount of fertilizer to be jarred or spilled off the rear end of the delivery pan.

In fertilizer distributors with which I am familiar there is no independent adjusting means provided for adjusting or leveling the delivery pan and when operating over sloping portions of the field the delivery pan cannot conveniently be maintained at a constant angular position with respect to the horizonal, which results in an uneven distribution of the fertilizer. When the fertilizer distributor is operated on an up-slope, the open discharge end of the delivery pan is tilted down permitting an excessive amount of fertilizer to be discharged and when operating in the opposite direction the discharge end of the pan is tilted upward whereby the amount of fertilizer discharged is greatly reduced. This uneven distribution may be overcome to some extent by adjusting the stroke of the pitman, but changing this adjustment may change the discharge action to such an extent that a proper movement of the fertilizer off of the pan will be seriously affected. As previously described, I have provided an independent adjusting means for adjusting the inclination of the delivery pan and which is controlled by the operator by shifting the lever 51. The manipulation of lever 51 does not affect the length of stroke of the pitman 61. It will be readily understood that my maintaining the delivery pan in the proper angular position relative to the horizontal, the distribution of the fertilizer will be uniform regardless of the contour of the ground and the pitman 61 need only be adjusted to obtain the proper discharge action for the fertilizer being used.

While I have described, in connection with the accompanying drawing, the specific form in which I prefer to embody my invention, it is to be understood that the invention is not to be limited to the specific means which I have herein shown and described, and that, in fact, widely different means may be employed in the practise of the broader aspects of my invention.

What I claim, therefore, and desire to secure by Letters Patent is:

1. A fertilizer distributor having a wheel supported frame and hopper, a vibrating delivery pan adapted to receive fertilizer from the hopper, said delivery pan being pivotallly supported at its front end, a reciprocating pitman pivotally secured to one side of the delivery pan and actuated by the supporting wheel for vibrating the pan, a bar rigidly secured to the other side of said pan, means for supporting the bar, means for adjusting the relation of the pitman and the wheel to vary the length of stroke of the pitman, and separate means for adjusting the bar, supporting means to vary the inclination of the pan, both said adjusting means being actuable while the distributor is in operation.

2. A fertilizer distributor adapted to be connected to propelling means and comprising a frame having a pair of grip handles and a hopper, a wheel supporting the frame and having a plurality of equidistantly spaced driving lugs formed thereon, a vibrating delivery pan pivotally supported below the hopper, a reciprocating pitman pivotally secured to one side of the delivery pan, means slidably supporting the other end of said pitman in a position to be actuated by the said driving lugs, a bar rigidly secured to the other side of said pan, means slidably supporting the other end of said bar, and means for vertically adjusting the pitman supporting means to vary the position of the pitman relative to the driving lugs, and means for vertically adjusting the bar supporting means, each of said adjusting means including a hand lever mounted on said frame adjacent one of the grip handles, whereby either adjusting means may be actuated without stopping the distributor or interfering with the operation thereof.

3. A fertilizer distributor comprising a frame and hopper, said frame including a pair of longitudinally disposed bars, an upwardly and rearwardly inclined handle bar secured to each longitudinal bar and terminating in a hand grip at its upper end, a brace bar between each handle bar and the adjacent longitudinal bar, a slot in each brace bar, a wheel supporting the frame and having a plurality of spaced driving lugs formed thereon, a vibrating delivery pan pivotally supported below the hopper, a lever mounted on each handle bar and positioned within reach of the operator, a link pivotally connected with each lever and having a bent over portion at right angles thereto and adapted to engage the slot in the adjacent brace bar, a reciprocating pitman pivotally secured to one side of the delivery pan and supported on the bent over portion of one of the links between said link and the adjacent brace, and a bar rigidly secured to the other side of said pan and supported on the bent over portion of the other link between said link and the adjacent brace.

4. A fertilizer distributor having a frame and hopper, a vibrating delivery pan adapted to receive fertilizer from the hopper, means for vibrating said pan including a pitman connected to the pan, and means for reciprocating the pitman, the extent of movement of the pitman varying with the vertical position of the pitman with respect to the reciprocating means, means for adjusting the vertical position of the pitman with respect to said reciprocating means, comprising a vertically movable adjusting link having a laterally bent portion on the lower end thereof, a substantially vertically disposed slot in a member of said frame adapted to receive said laterally bent portion, said pitman being supported on said laterally bent portion between said link and said frame member.

5. A fertilizer distributor having a frame and hopper, a vibrating delivery pan adapted to receive fertilizer from the hopper, an adjusting means for adjusting the inclination of the delivery pan, said means comprising a substantially vertically disposed adjusting link having a laterally bent portion on the lower end thereof, a vertically disposed slot in a member of said frame adapted to receive said laterally bent portion, and a bar rigidly secured to said pan and supported on said laterally bent portion between said link and said frame member.

6. A fertilizer distributor having a wheel supported frame and hopper, a delivery pan movably supported below the hopper and adapted to receive fertilizer therefrom, a reciprocating pitman pivotally secured to one side of the delivery pan and actuated by the supporting wheel for vibrating the pan, a bar rigidly secured to the other side of said pan, means for supporting the bar, means for adjusting the relation of the pitman and the wheel to vary the length of stroke of the pitman, and separate means for adjusting the bar supporting means to vary the inclination of the pan, both said adjusting means being actuable while the distributor is in operation.

CHRISTIAN E. JOHNSON.